United States Patent [19]

Nakamura et al.

[11] 4,068,152

[45] Jan. 10, 1978

[54] POWER SUPPLY SYSTEM FOR A LINEAR MOTOR

[75] Inventors: Kiyoshi Nakamura, Katsuta; Takashi Tsuboi; Nobuaki Otazawa, both of Hitachi, all of Japan

[73] Assignee: Hitachi, Ltd., Japan

[21] Appl. No.: 338,943

[22] Filed: Mar. 7, 1973

[30] Foreign Application Priority Data

Mar. 8, 1972 Japan .................................. 47-24970
Mar. 8, 1972 Japan .................................. 47-24971

[51] Int. Cl.² ........................................... H02K 41/00
[52] U.S. Cl. ..................................... 318/135; 310/12; 104/148 LM
[58] Field of Search ................. 104/148 LM, 148; 310/12-14; 318/135, 37, 38

[56] References Cited

U.S. PATENT DOCUMENTS

| | | | |
|---|---|---|---|
| 2,412,515 | 12/1946 | James et al. | 318/135 |
| 3,225,228 | 12/1965 | Roshala | 310/12 |
| 3,555,380 | 1/1971 | Hings | 104/148 LM X |
| 3,577,929 | 5/1971 | Onoda et al. | 104/148 LM |
| 3,712,240 | 1/1973 | Donlon et al. | 104/148 LM |
| 3,721,874 | 3/1973 | Pelenc et al. | 318/135 |

*Primary Examiner*—Donovan F. Duggan
*Attorney, Agent, or Firm*—Craig & Antonelli

[57] ABSTRACT

In a linear motor system in which the series of driving coils provided along a railway is divided into sections each including a plurality of coils, each section being fed through a power control switch which is closed in a sequential order, a plurality of such sections are grouped so that each group of sections is fed exclusively through one of a plurality of feeders from one of a plurality of power supplies.

11 Claims, 15 Drawing Figures

POWER SUPPLY SYSTEM FOR A LINEAR MOTOR

BACKGROUND OF THE INVENTION

1. Field of the Invention

This invention relates to linear motors used in super-high speed transportation systems, and more particularly to a power supply system for supplying power to driving coils of an elongated linear motor system such as a linear induction motor system, linear synchronous motor system or d.c. linear motor system disposed on the ground. The present invention has for its object to provide a highly economical and reliable power supply system capable of supplying power effectively to driving coils which constitute a load of low utility factor.

2. Description of the Prior Art

According to a method proposed hitherto for supplying power to the driving coils of an elongated linear motor system, the elongated linear motor is divided into a plurality of major sections and a power supply unit is provided for each of these sections for supplying power thereto. While this method has been advantageous in respect of the power supply equipment, it has been uneconomical in that the capacity of the power supply equipment is excessively large due to large reactive power requirements. In an effort to obviate the above disadvantage, a method has been proposed according to which each of such major linear motor sections (which are called so hereinafter although they are actually the driving coils) is suitably divided into a plurality of unit linear motors and power is successively supplied to these unit linear motors as a carriage moves therealong. The present invention is concerned with a power supply system for supplying power to such unit linear motors. According to the prior art proposal, a power supply unit consisting of, for example, a voltage step-down transformer and a converter such as an inverter, cyclo-converter or chopper is connected to each unit linear motor and the power supply units are successively switched over with the movement of a carriage. While this method has been advantageous in that supply of reactive power can be eliminated and the power supply units need not have any excessive capacity, it has been uneconomical in that the power supply units are required in a large number. A method has been proposed to obviate the above disadvantage. According to this proposal, a single power supply unit is connected to the unit linear motors through mechanical switches or thyristor type electrical switches and power is supplied to these unit linear motors by successively turning on and off these switches. While this method has been economical, it has had the following defects: The number of the unit linear motors associated with a moving carriage varies with the movement of the carriage. Thus, (1) the power supply unit must have a capacity which can simultaneously feed a plurality of the unit linear motors, resulting in redundancy of the capacity in the state in which the number of the unit linear motors simultaneously supplied with power is less than the predetermined maximum. Suppose, for example, that the zone of each unit linear motor is longer than the length of the carriage and 100% power is supplied to one of the unit linear motors when the carriage exists on such unit linear motor. In this case, 200% power must be supplied when the carriage is moving across two of the unit linear motors, and the power supply unit must have a 200% capacity. (2) In the state in which a plurality of these unit linear motors are simultaneously supplied with power, they are connected in parallel to the same power supply unit. In this case, any unbalance between the individual unit linear motors results in unbalanced supply of power to these unit linear motors. Further, when the converter of the kind above described is incorporated in the power supply unit, this converter is limited to the voltage type. Thus, this power supply system cannot be universally employed in view of the fact that the converter is preferably of the current type in the case of the power supply unit for a linear synchronous motor or d.c. linear motor. (3) The switches must have a sufficient breaking capacity due to the fact that the switches are opened in the state in which current is conducted therethrough. (4) The above defect may be obviated by switching over the switches in the state in which any substantial power is not supplied from the power supply unit. However, this is objectionable for the purpose of propulsion of the carriage since any substantial power is not supplied to the linear motor during this period of time. (5) Due to the fact that only one power supply unit is provided for the linear motor section and all the unit linear motors belonging to this section are fed from this power supply unit, no power can be supplied to this linear motor section in the event of failure of the power supply unit, thereby obstructing the movement of the carriage. Thus, this power supply system is not fully reliable.

SUMMARY OF THE INVENTION

The present invention provides improvements in the prior art systems having various defects as above described and is featured by a power supply system for supplying power to a linear motor of the kind divided into a plurality of unit linear motors, in which a plurality of switches are connected at one terminal thereof to the respective unit linear motors, and these switches are connected at the other terminal thereof to one or another of a plurality of feeders of a number less than that of the unit linear motors in regular sequence with respect to the positional order thereof. Further, each feeder is connected to each of power supply units.

According to the present invention having the feature above described, the power supply units and switches can satisfactorily cooperate with each other for the propulsion of a carriage. This improved power supply system is highly economical and reliable and is especially effective when a converter which is able to control the current is employed therein.

BRIEF DESCRIPTION OF THE DRAWINGS

FIGS. 5b and 5c show waveforms appearing at various parts of the systems shown in FIGS. 1c and 2 respectively in the condition shown in FIG. 5a.

FIG. 6a is a view similar to FIG. 2 but showing a modification suitable to deal with the condition shown in FIG. 5a.

FIG. 6b shows waveforms appearing at various parts of the system shown in FIG. 6a.

DESCRIPTION OF THE PREFERRED EMBODIMENTS

The present invention will now be described in detail in connection with the preferred embodiments thereof and in comparison with the known systems.

Figure 1A:
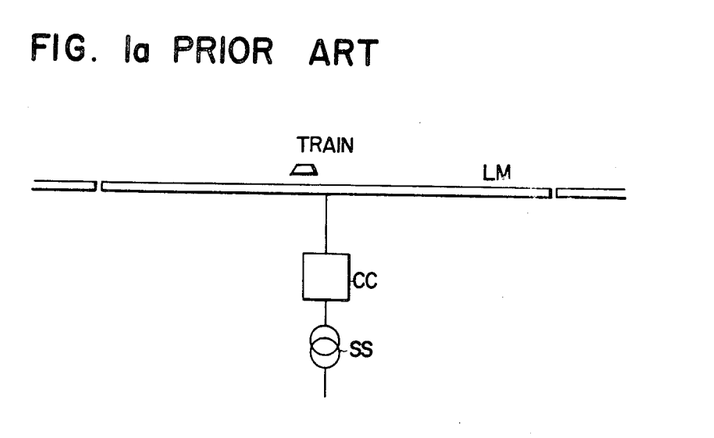
FIGS. 1a, 1b and 1c are diagrammatic views showing various prior art power supply systems for a linear motor.
Figure 1B:
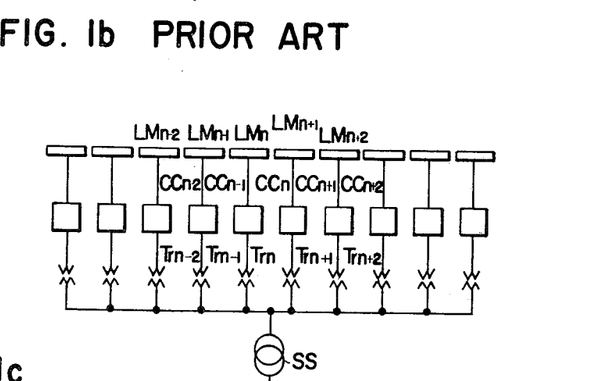
Figure 1C:
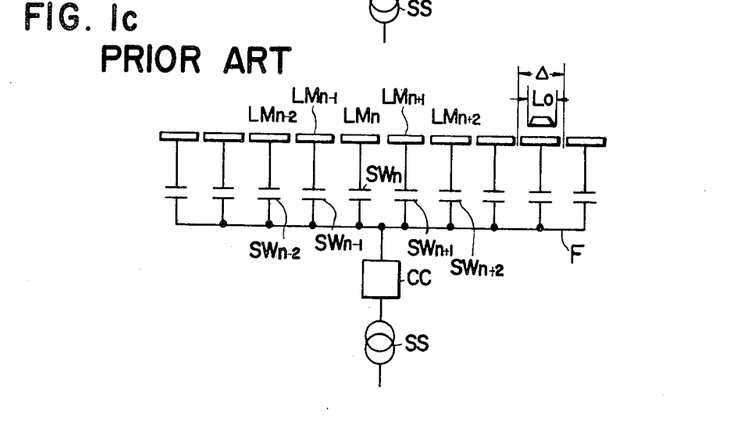

Referring to FIG. 1a showing one of the prior art power supply systems, an elongated linear motor is divided into a plurality of major sections LM and a power supply unit consisting of a voltage reducing substation SS and a converter CC is provided for each of these major linear motor sections LM for supplying power required for the propulsion of a carriage TRAIN. Referring to FIG. 1b showing another prior art power supply system, such a major linear motor section LM is divided into a plurality of unit linear motors $LM_n$ and power is supplied from a substation SS to these unit linear motors $LM_n$ through a plurality of voltage step-down transformers $Tr_n$ and converters $CC_n$, so that power can be successively supplied to the unit linear motors $LM_n$ through the corresponding converters with the movement of a carriage. Referring to FIG. 1c showing another prior art power supply system, such a major linear motor section LM is similarly divided into a plurality of unit linear motors $LM_n$ and power is supplied from a substation SS to these unit linear motors $LM_n$ through a single converter CC and a plurality of switches $SW_n$ so that the unit linear motors $LM_n$ can be successively fed through the corresponding switches $SW_n$ which are successively switched over with the movement of a carriage. However, these prior art systems have defects as pointed out in the foregoing.

Figure 2:
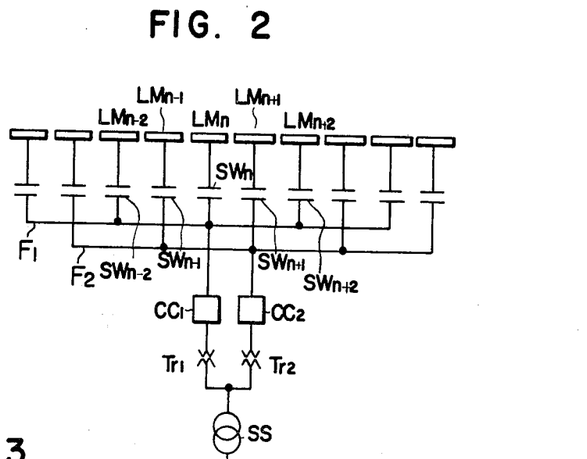
FIG. 2 is a diagrammatic view showing a power supply system embodying the present invention.

Referring now to FIG. 2 showing a power supply system embodying the present invention, a major linear motor section is divided into a plurality of unit linear motors $LM_n$, and a power supply means consisting of a transformer $Tr_1$, a converter $CC_1$ and a feeder $F_1$ and another power supply means consisting of a transformer $Tr_2$, a converter $CC_2$ and a feeder $F_2$ are connected to a substation SS. A plurality of switches $SW_n$ are provided for the respective unit linear motors $LM_n$ and are divided into two groups in such a manner that one group including the switches $SW_{n-2}$, $SW_n$ and $SW_{n+2}$ are connected to the feeder $F_1$ which is connected to the converter $CC_1$ and the other group including the switches $SW_{n-1}$ and $SW_{n+1}$ are connected to the feeder $F_2$ which is connected to the converter $CC_2$. These switches are successively closed with the movement of a carriage so that power can be supplied to the unit linear motors through the feeders from the corresponding converters.

Figure 3:
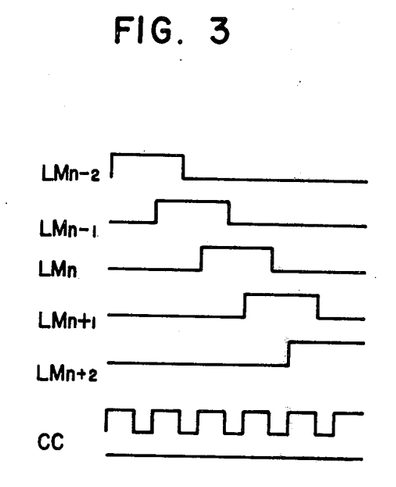
FIGS. 3 and 4 show waveforms appearing at various parts of the systems shown in FIGS. 1c and 2 respectively.
Figure 4:
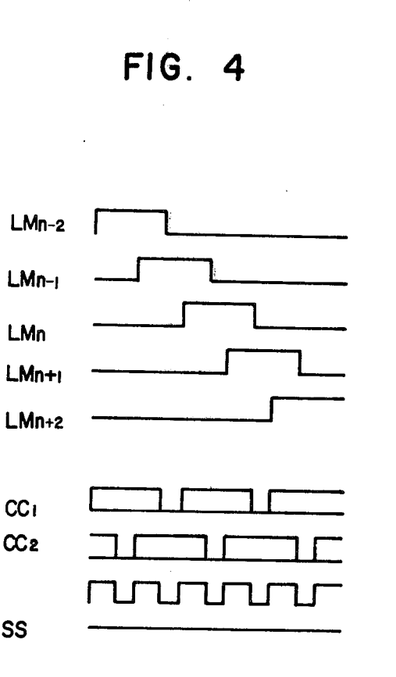

FIGS. 3 and 4 show waveforms appearing at various parts of the power supply systems shown in FIGS. 1c and 2 respectively. In this case, it is supposed that the effective length $L_o$ of the carriage is smaller than the zone length L of each unit linear motor. This effective length is represented by the entire longitudinal length of the reaction plate mounted on the carriage in the case of the linear induction motor, while this effective length is represented by the entire longitudinal length of the field system mounted on the carriage in the case of the linear synchronous motor or d.c. linear motor. The power supplied to each unit linear motor is the same in both these power supply systems. However, in the system shown in FIG. 1c, the converter CC must have a maximum capacity of 200% in order to feed two unit linear motors simultaneously. Further, due to the fact that the power is supplied continuously, the switches must be opened in the state in which current is conducted therethrough, and therefore, there are problems in respect of the breaking ability and maintenance. Furthermore, due to the fact that the loads of the converter are connected in parallel with one another and vary within the range of 100% to 200% in the power supply system shown in FIG. 1c, the converter CC must be of the voltage type which is not suitable for application to a linear motor such as a linear synchronous motor or d.c. linear motor. Thus, this power supply system cannot be universally employed. Moreover, because of the fact that the converter CC is of the voltage type and the loads thereof are arranged in parallel, any unbalance between the loads would result in an unbalanced supply of power. In addition, all the unit linear motors connected to the same converter CC are rendered inoperative in the event of failure of the converter CC, resulting in a hindrance to the proper movement of the carriage.

These defects are obviated by the power supply system of the present invention shown in FIG. 2. It will be seen from the oscillogram shown in FIG. 4, the converters $CC_1$ and $CC_2$ act to energize always one of the unit linear motors respectively. Therefore, the converters are not limited to the voltage type and may be of the current type and the type of the converters may be suitably selected depending on the type of the linear motor. Further, due to the fact that in the series of switches connected to one converter, for example $CC_1$ in FIG. 2, a switch (for example $SW_{n+2}$) is to be closed only after another switch ($SW_n$) at the second next position is opened, the operating cycle is one half of that in the system shown in FIG. 1c and there is an ample interval between the operation of the switches. The converters can cooperate with the switches so that the switches can be opened in the state in which low power or no power is supplied from the converters during the change-over of the switches, and thus any especial breaking ability is not required. Furthermore, even when one of the converters is disabled, the remaining converter can supply power to the unit linear motors connected thereto. Thus, this power supply system is highly reliable in that the carriage can be satisfactorily propelled without any appreciable hindrance although the mean power supply to the linear motor section is decreased.

Figure 5A:
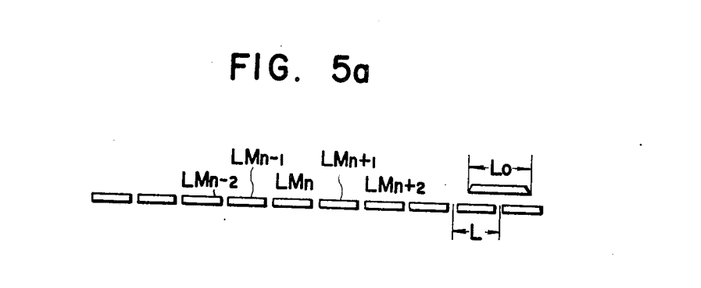
FIG. 5a shows the case in which the effective length of the carriage is larger than the extent of the unit linear motor.
Figure 5B:
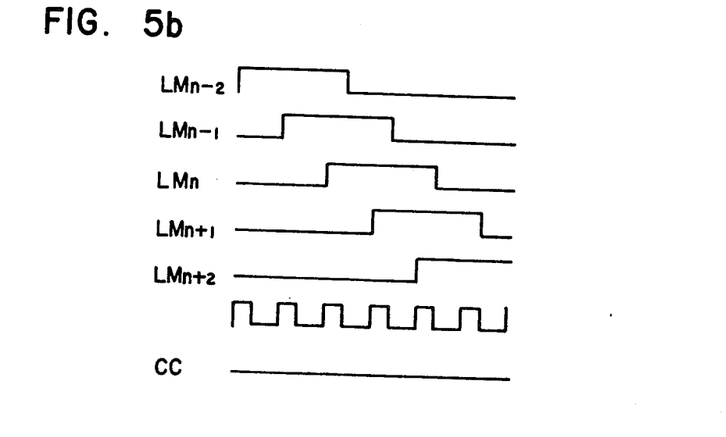
Figure 5C:
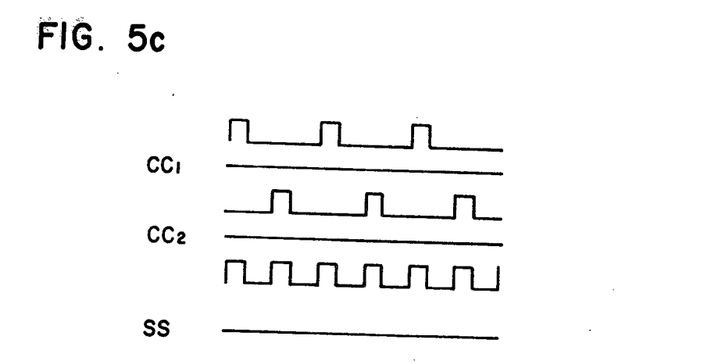
Figure 6A:
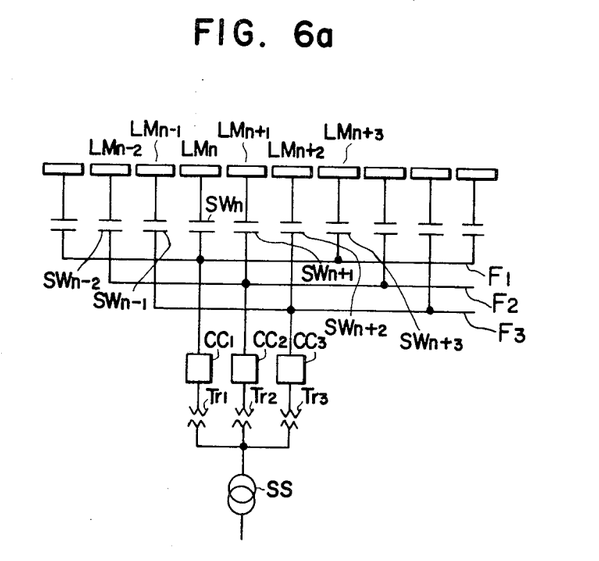
Figure 6B:
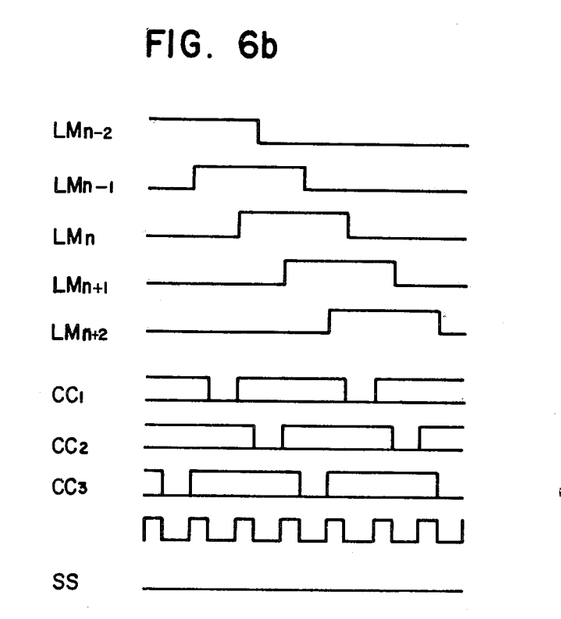

FIG. 5a shows the case in which the effective length $L_o$ of the carriage is larger than the zone length L of the unit linear motor but smaller than 2L. In such a case, the power supply system having two sets of feeders and converters as shown in FIGS. 1c and 2 operate with waveforms as shown in FIGS. 5b and 5c respectively. Referring to FIG. 5c showing the waveforms appearing in the power supply system having two feeder groups and two converters as shown in FIG. 2, it may be possible that two unit linear motors are simultaneously fed from a converter and the converter is continuously loaded. In order to avoid the opening of the switches in the state in which current is conducted therethrough, a modification having three power supply means each consisting of a transformer and a converter may be employed as shown in FIG. 6a. Such a power supply system operates with waveforms as shown in FIG. 6b, and it will be seen that the operation can be carried out in a manner similar to that shown in FIG. 4. Thus, in order that the cooperation between the converters and the switches in the power supply system according to the present invention can be effectively attained and especially the switches can be opened in the no current state, the combinations of feeder and converter may be employed in a number which is equal to an integer which is not smaller than the value $L_o/L + 1$ and the switches connected to the unit linear motors may be grouped in a regular cyclic sequence with respect to the positional order thereof so that each group may be connected to one of the converters through the associated feeder.

Figure 7A:
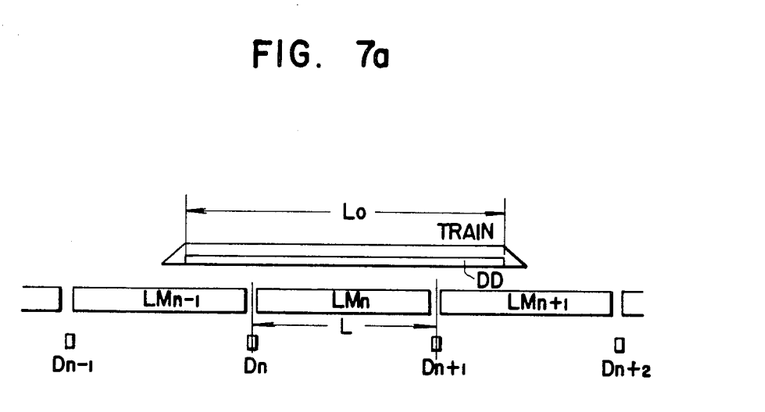
FIGS. 7a and 7b show two preferred forms of detector arrangement for detecting the movement of the carriage for controlling the power supply system according to the present invention.
Figure 7B:
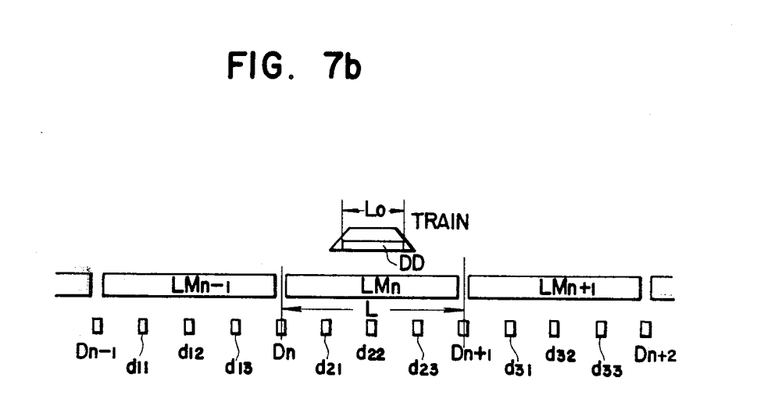

One form of carriage detecting means and logical control means for controlling the supply of power to the unit linear motors arranged in the above manner will be described with reference to FIGS. 7a and 7b and FIG. 8 respectively. FIGS. 7a and 7b show two different forms of detector arrangement preferably used for detecting a carriage DD. The length $L_o$ of the carriage DD corresponds to the effective length of the carriage TRAIN. Referring to FIG. 7a, $L_o > L$ and one detector is disposed between the adjacent unit linear motors $LM_n$. The distance between the detectors is equal to L. (L is the zone length of unit linear motor.) When a detected output signal appears from, for examle, the detector $D_{n1}$ power is supplied to the unit linear motors $LM_{n-1}$ and $LM_n$ lying on opposite sides of the detector $D_n$. This manner of power supply is effective in that the power can be reliably supplied to the unit linear motors underlying the effective portion of the moving body and the moving body can be efficiently propelled in both the forward and backward directions. In the illustrated example, power is being supplied to the unit linear motors $LM_{n-1}$, $LM_n$ and $LM_{n+1}$.

Referring to FIG. 7b, $L_o < L$ and a plurality of auxiliary detectors, the number of which is at least equal to an integer not smaller than $L/L_o - 1$, are disposed in the zone of each unit linear motor $LM_n$ in addition to detectors $D_n$ each of which is disposed between the adjacent unit linear motors $LM_n$. These auxiliary detectors $d_{11}$ to $d_{33}$ generate a detected output signal as the moving body DD moves over them, and the corresponding unit linear motors are energized in response to the appearance of the output signals from these auxiliary detectors. In this connection, the switches interposed between the converters and the unit linear motors may operate with a time lag. Especially when $L_o < L$ as shown in FIG. 7b and the carriage is moving across two of the unit linear motors, it is important that, in order to reliably supply power to these two unit linear motors, instructions for closing the switch is beforehand applied to the switch connected to the unit linear motor lying on the advancing side between these two unit linear motors. Suppose that the carriage is moving over the unit linear motor $LM_n$ toward the next adjacent unit linear motor $LM_{n+1}$ in FIG. 7b. In such as case, application of the switch closing instructions to the switch $SW_{n+1}$ connected to the unit linear motor $LM_{n+1}$ for feeding this unit linear motor $LM_{n+1}$ in response to the output signal of the detector $D_{n+1}$ is undesirable in that the switch $SW_{n+1}$ connected to the unit linear motor $LM_{n+1}$ would not be closed until a substantial portion of the carriage moves into the zone of the unit linear motor $LM_{n+1}$ and the desired propulsive force may not be applied from the unit linear motor $LM_{n+1}$ to the carriage during this period of time. In order to avoid such an undesirable situation, the switch $SW_{n+1}$ connected to the unit linear motor $LM_{n+1}$ may be arranged to be closed in response to the appearance of the output signal from, for example, the auxiliary detector $d_{23}$ disposed backward relative to the detector $D_{n+1}$.

Figure 8:
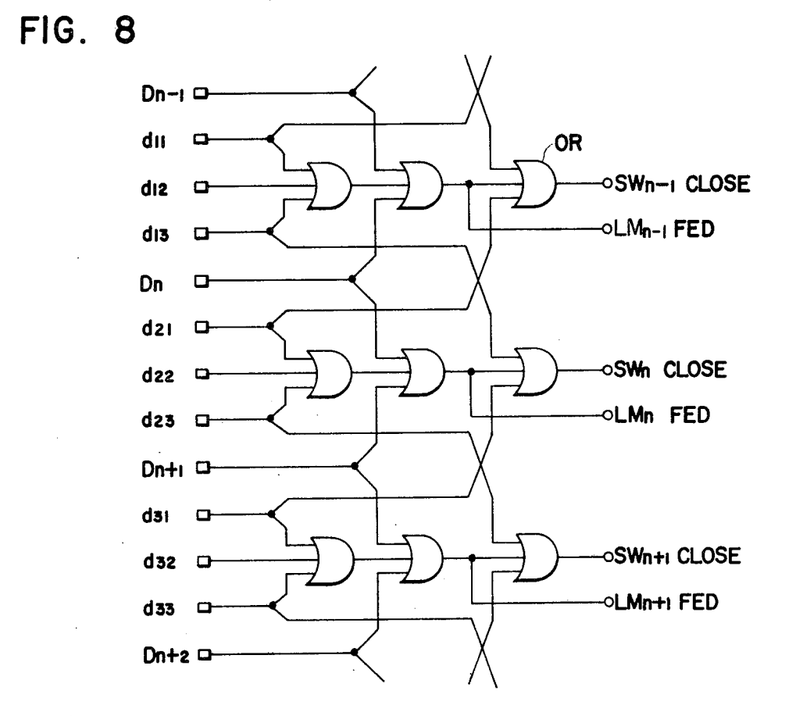
FIG. 8 shows one form of logical control means for instructing the supply of power and closure of switches in response to the signals applied from the detectors.
Figure 9:
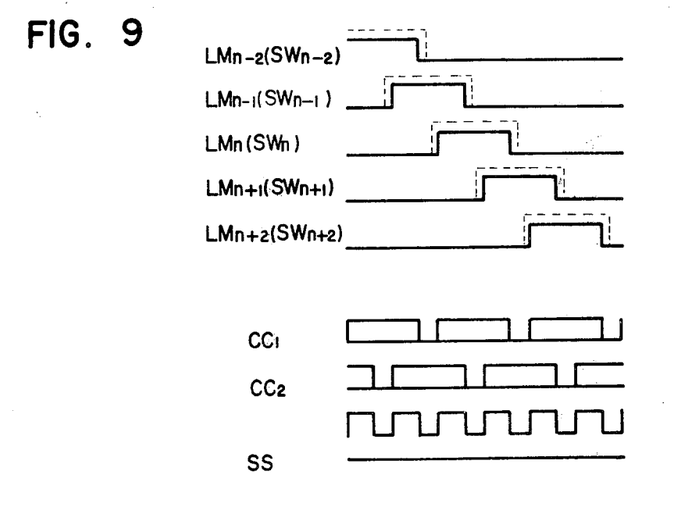
FIG. 9 shows the operation of the power supply system shown in FIG. 2 in response to the instructions applied from the control means shown in FIG. 8.

FIG. 8 shows a logical control circuit for delivering the switch closing instructions and power supplying instructions in response to the application of the detected output signals of these detectors. Referring to FIG. 8, the closing instructions for the switch $SW_n$ are previously delivered from an OR gate OR in response to the appearance of the output signal from the auxiliary detector $d_{13}$ for supplying power to, for example, the unit linear motor $LM_n$, and after the closure of the switch $SW_n$, supply of the power is started in response to the appearance of the output signal from the detector $D_n$. The power is kept supplied to the unit linear motor $LM_n$ during the period of time in which the effective portion of the moving body exists above the unit linear motor $LM_n$, that is, until the output signal of the detector $D_{n+1}$ disappears. After the carriage moves into the zones of the next adjacent unit linear motor $LM_{n+1}$, supply of the power to the unit linear motor $LM_n$ is stopped, and then, the switch $SW_n$ is opened in no-load state (when current is conducted therethrough) upon disappearance of the output signal of the auxiliary detector $d_{31}$. The no-load state is attained by means of a controllable converter (for example, a cycle converter) CC or a switch means provided between the feeder and a converter. This logical control circuit is adapted for energization of the unit linear motors for the propulsion of the carriage in both forward and backward directions. When the carriage is propelled in the forward direction only, the signal path leading from, for example, the auxiliary detector $d_{31}$ to the OR gate for applying the switch closing instructions for the switch $SW_n$ is unnecessary. FIG. 9 shows waveforms appearing in the feeding operation above described. The solid lines represent the power waveforms applied to the unit linear motors $LM_n$ and the broken lines represent the operation of the associated switches $SW_n$. It will be seen from FIG. 9 that two unit linear motors are energized simultaneously when the carriage is moving across these unit linear motors.

We claim:

1. A power supply system for a linear motor having a series of driving coils disposed along a track for producing a moving magnetic field to drive a carriage; said system comprising means for dividing said series of driving coils into a number of coil units successively disposed along the track, a plurality of feeders disposed along said track, the number of the feeders being less than the number of said coil units, power supply means connected to said feeders, and a number of switch means connected between respective ones of said feeders and each of said coil units so as to distribute said coil units among said feeders in regular cyclic sequence with respect to the positional order of said coil units, wherein the number of said power supply means is equal to that of said feeders so that each feeder is connected to a respective power supply means.

2. A power supply system according to claim 1, wherein the number of said feeders is equal to an integral number not less than the value determined by $L_o/L + 1$, where $L_o$ is the effective length of the carriage and L is the zone length of each coil unit.

3. A power supply system according to claim 1, wherein means are provided for closing or opening said switches in the state where the power being conducted therethrough is substantially zero.

4. A power supply system according to claim 1, wherein means are provided for reducing power supplied to a feeder which feeds the coil unit from the zone of which the carriage has just moved out and for then opening the switch means connected between said feeder and said last-mentioned coil unit while closing the next switch means connected to the same feeder.

5. A power supply system according to claim 4, wherein a plurality of auxiliary detectors are provided in mutually spaced relation in each zone between adjacent ones of said detectors, the number of said auxiliary detectors in a zone being equal to an integer number not less than the value determined by $L'/L_o - 1$, where $L_o$ is the effective length of the carriage and $L'$ is the distance between said adjacent detectors.

6. A power supply system according to claim 1, wherein a detector is provided between each of said coil units and an adjacent coil unit for detecting the movement of said carriage, so that said adjacent coil unit is energized in response to the appearance of an output signal from said detector.

7. A power supply system for a linear motor having a series of driving coils disposed along a track for producing a moving magnetic field to drive a carriage; said system comprising means for dividing said series of driving coils into a number of coil units successively disposed along the track, a plurality of feeders disposed along said track, the number of the feeders being less than the number of said coil units, power supply means connected to said feeders, and a number of switch means connected between respective ones of said feeders and each of said coil units so as to distribute said coil units among said feeders in regular cyclic sequence with respect to the positional order of said coil units, wherein means are provided for reducing power supplied to a feeder which feeds the coil unit from the zone of which the carriage has just moved out and for then opening the switch means connected between said feeder and said last-mentioned coil unit while closing the next switch means connected to the same feeder, and a plurality of auxiliary detectors are provided in mutually spaced relation in each zone between adjacent ones of said detectors, the number of said auxiliary detectors in a zone being equal to an integer number not less than the value determined by $L'/L_o - 1$, where $L_o$ is the effective length of the carriage and $L'$ is the distance between said adjacent detectors.

8. A power supply system for a linear motor which drives a carriage along a track, said system comprising
 a. driving coils consisting of at least a first coil unit group and a second coil unit group, each of said coil unit groups including a plurality of coil units, the coil units belonging to said first coil unit group and the coil units belonging to said second coil unit group being alternately disposed along said track for said carriage,
 b. a first controllable power supply means connected to each coil unit of said first coil unit group through a switch,
 c. a second controllable power supply means connected to each coil unit of said second coil unit group through a switch, and
 d. detecting means for detecting the location of said carriage and controlling said first and second controllable power supply means, said detecting means being disposed between one coil unit of said first coil unit group and an adjacent coil unit of said second coil unit group for detecting said carriage's passing said one coil unit of said first coil unit group, and issuing a detection signal in response thereto, and
 said first controllable power supply means including control means for reducing the power output of said first controllable power supply means in response to said detection signal of said detecting means and then opening a switch connected to said one coil unit of said first coil unit group which said carriage passed, while closing said adjacent coil unit of said second coil unit group located in the forward side of said carriage in relation to said one coil unit and after that increasing the power output of said first controllable power supply means.

9. A power supply system according to claim 8, which further includes a plurality of auxiliary detecting means disposed between said detecting means for detecting an approaching carriage and sending a detection signal to said controllable power supply means and switches.

10. A power supply system according to claim 9, wherein the number of said auxiliary detecting means is an integral number larger than $L'/L_o - 1$, where $L_o$ is the effective length of said carriage and $L'$ is the distance between two successive detecting means.

11. A power supply system for a linear motor which drives a carriage along a track, said system comprising
 a. driving coils consisting of at least a first coil unit group and a second coil unit group, each of said coil unit groups including a plurality of coil units, the coil units belonging to said first coil unit group and the coil units belonging to said second coil unit group being alternately disposed along said track for said carriage.
 b. a first controllable power supply means connected to each coil unit of said first coil unit group through a switch,
 c. a second controllable power supply means connected to each coil unit of said second coil unit group through a switch, and
 d. detecting means for detecting the location of said carriage and controlling said first and second controllable power means,
 the number of said controllable power supply means being an integral number larger than $L_o/L + 1$, wherein $L_o$ is the effective length of said carriage and L is the length of a coil unit.

* * * * *